(12) United States Patent
Wang et al.

(10) Patent No.: US 8,796,974 B2
(45) Date of Patent: Aug. 5, 2014

(54) PMSM INITIAL POSITION DETECTION SYSTEM AND METHOD

(75) Inventors: Xiaoyan Wang, Plano, TX (US); Yateendra Deshpande, Bryan, TX (US)

(73) Assignee: Texas Instruments Incorporated, Dallas, TX (US)

( * ) Notice: Subject to any disclaimer, the term of this patent is extended or adjusted under 35 U.S.C. 154(b) by 152 days.

(21) Appl. No.: 13/567,815

(22) Filed: Aug. 6, 2012

(65) Prior Publication Data

US 2014/0035502 A1 Feb. 6, 2014

(51) Int. Cl.
*H02P 6/08* (2006.01)
*H02K 29/12* (2006.01)

(52) U.S. Cl.
CPC ..................................... *H02K 29/12* (2013.01)
USPC .................. 318/400.37; 318/400.01; 318/700

(58) Field of Classification Search
CPC ............................... H02K 29/08; H02K 29/12
USPC ................. 318/400.37, 400.01, 700
See application file for complete search history.

(56) References Cited

U.S. PATENT DOCUMENTS 5,191,270 A   3/1993 McCormack
5,569,994 A * 10/1996 Taylor et al. ................... 318/700
5,608,300 A * 3/1997 Kawabata et al. ............ 318/721
5,841,252 A * 11/1998 Dunfield ................... 318/400.32
7,072,778 B2   7/2006 Swanson
7,334,854 B1   2/2008 Chang et al.
8,072,165 B2 * 12/2011 Baba et al. ............... 318/400.13

OTHER PUBLICATIONS

"Sensorless Field Oriented Control of PMSM Motors", by Jorge Zambada, Microchip Technology Inc., 2007, pp. 1-30.

* cited by examiner

*Primary Examiner* — David Luo
(74) *Attorney, Agent, or Firm* — John R. Pessetto; Frederick J. Telecky, Jr.

(57) ABSTRACT

A system for determining an initial position of a rotor (9) of a PMSM motor includes a motor controller (2) coupled to a plurality of phase windings of the motor by means of an actuation circuit (3). A processor (12) and an interface circuit (14) are coupled to the processor and the phase windings. The processor determines if the rotor speed is zero, and if so causes the actuation circuit to sequentially apply voltage signals (Vab, Vba, Vac, Vca, Vbc, and Vcb) to the phase windings to produce corresponding phase winding current signals (Iab, Icb, Ica, Iba, Ibc, Iac) in the various phase windings. The phase winding current signals are sensed and digitized. The processor then determines a position of a magnetic flux path associated with the rotor by computing the initial position of the rotor from one of the digitized phase winding current signals associated with the predetermined magnetic flux path.

13 Claims, 6 Drawing Sheets

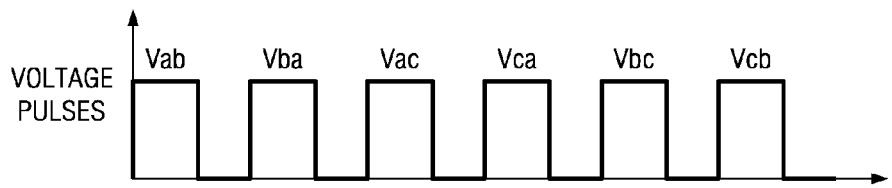
*FIG. 3A*
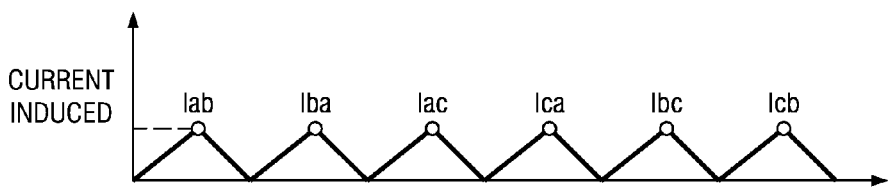
*FIG. 3B*
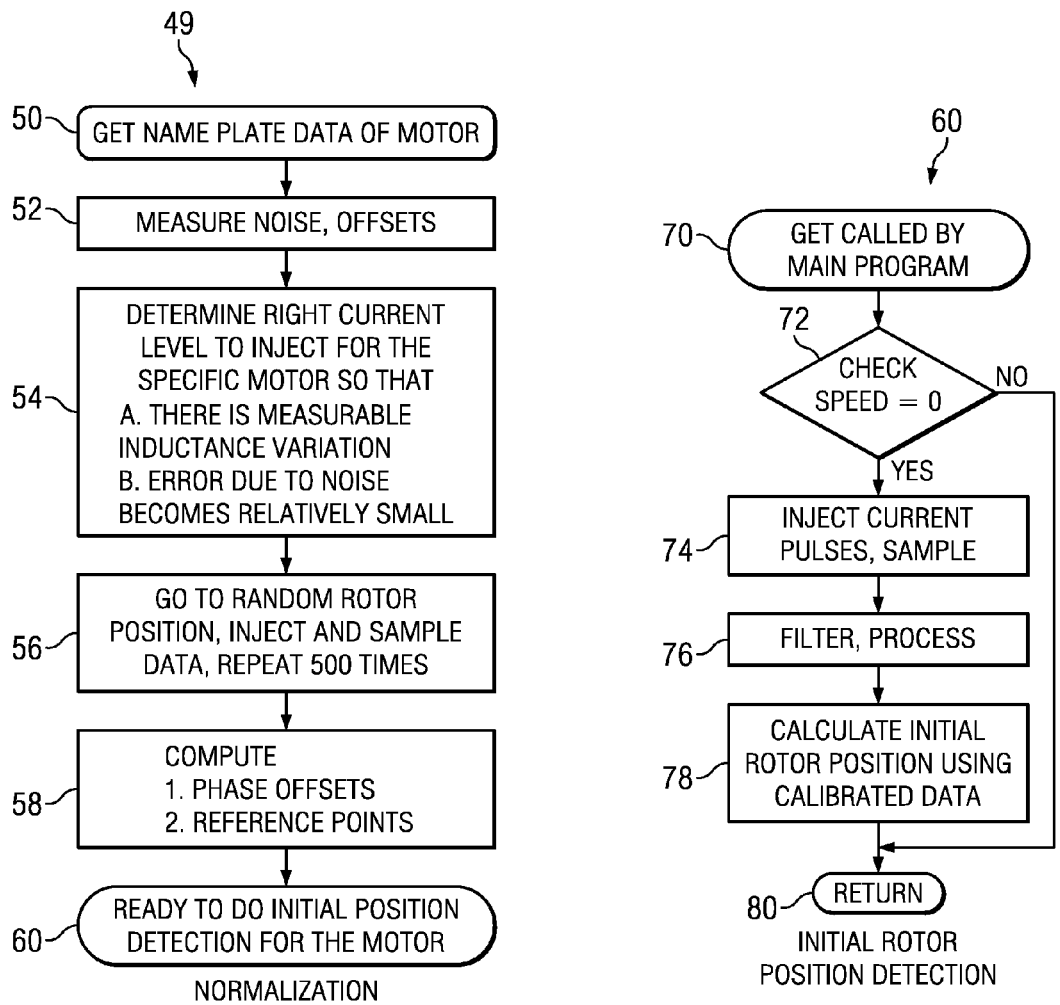
*FIG. 6*
*FIG. 7*

PMSM INITIAL POSITION DETECTION SYSTEM AND METHOD

BACKGROUND OF THE INVENTION

The present invention relates generally to improving accuracy in the detection or determination of initial rotor position in a PMSM (permanent magnet synchronous motor) without use of physical rotor position/speed detection devices or back-EMF sensing techniques, and more particularly to more accurately determining initial rotor position while the rotor is stationary, and still more particularly to more accurately determining initial rotor position without requiring knowledge of variations in specific motor parameters.

It is desirable to know the rotor position in some motor control applications. Accurate determination of rotor position is needed for field orientation control (FOC) of PMSM rotors to achieve accurate, efficient motor operation. Rotor position can be acquired either from physical devices such as an encoder or by use of back-EMF sensing techniques.

A physical sensor such as a Hall effect sensor is commonly used to detect the rotor position, which may be used in a motor controller algorithm. The mounting accuracy of such sensors significantly limits the accuracy of the rotor position determined using such sensors. Use of sensorless motors avoids rotor position inaccuracies caused by sensor mounting inaccuracies. Prior sensorless rotor position sensing techniques are based on electrical voltage and current signals and therefore require the motor to be running in order to determine initial rotor position. If the rotor is at a standstill, there is no simple, practical way of determining the rotor position. For example, there is no back EMF signal which can be used to detect rotor position if the motor is not running. Prior sensorless techniques for determining rotor position (for example as described in U.S. Pat. No. 7,334,854 "Sensorless Start-up Method for Driving a Brushless DC Motor" issued to Chang et al. on Feb. 26, 2008) work only on one kind of motor rather than a variety of kinds of motors and are relatively inaccurate because of motor-to-motor parameter variations.

Hall-effect sensors are employed in many large motor applications (e.g., for powering vehicles) to determine rotor position which may be used in a motor controller algorithm. However, Hall effect sensors are expensive and generally are unreliable so it is desirable to eliminate them from motor controllers. The most unreliable part of a motor control system usually is its rotor position detector/speed control device, and since two or three rotor position detector/speed control devices are frequently needed, a sensorless approach to determining rotor position may substantially reduce cost and substantially improve reliability of remote control systems. Consequently, it would be very desirable to have a sensorless technique for determining rotor position, especially initial rotor position.

Although use of Hall-effect sensors has been successfully eliminated from many small motor applications (e.g., powering hard disk drives), the approach of eliminating Hall-effect sensors is not suitable for large motor applications because of various problems, including problems with maintaining initial rotor position at motor startup. Furthermore, if the rotor is stationary these methods can not be applied either in conjunction with sensor-based motor circuits in conjunction with non-absolute position transducers.

Commonly assigned patent application Ser. No. 13/009,538 filed Ser. No. 13/009,538 entitled "Initial Position Detection for A Sensorless, Brushless DC Motor" by Xiaoyan Wang, incorporated herein by reference, discloses a sensing circuit and a microcontroller having a memory with a lookup table (LUT) stored therein, wherein the microcontroller generates 2N voltage pulses for 2N pairs of phases of a sensorless, brushless direct current (DC) motor having N phases, and wherein the microcontroller is coupled to the sensing circuit so as to determine a phase inductance from a current for each of the 2N pairs of phases of the DC motor, and wherein the microcontroller determines an initial position of the DC motor from the LUT by using the phase inductance from the current for each of the 2N pairs of phases of the DC motor.

A motor controller algorithm may need to utilize parameters of the motor, and this may be problematic if the algorithm needs to provide accurate control of a number of different motors, especially different types of motors, because of significant motor-to-motor differences in corresponding parameters of the various motors. It would be highly desirable for a PMSM motor control system to be more "robust" than the prior art in that the motor control system could economically and accurately calibrate every individual PMSM motor to provide accurate initial rotor position independently of motor-to-motor parameter and temperature differences and also independently of PMSM motor type. It also would be highly desirable for a PMSM motor control system to be more "intelligent" than the prior art in that the motor control system could automatically provide such robust calibration.

The closest prior art is believed to include U.S. Pat. No. 5,191,270 "Method for Starting a Motor" issued to McCormack Mar. 2, 1993; U.S. Pat. No. 7,072,778 "Method and System for Determining a Rotor Position in a Wound Field DC Motor" issued to Swanson Jul. 4, 2006; and U.S. Pat. No. 7,334,854 "Sensorless Start-up Method for Driving a Brushless DC Motor" issued to Chang et al. On Feb. 26, 2008.

Thus, there is an unmet need for a PMSM initial rotor position determination system which operates more accurately than prior initial rotor position detection systems.

There also is an unmet need for a PMSM initial rotor position determination system which operates more efficiently than prior initial rotor position detection systems.

Also is an unmet need for a system and method for accurately determining the initial position of a motor when its rotor is stationary.

There also is an unmet need for a PMSM initial rotor position determination system which is more economical than prior initial rotor position detection systems.

There also is an unmet need for a PMSM initial rotor position determination system which is more robust than prior initial rotor position detection systems.

There also is an unmet need for a PMSM initial rotor position determination system which is more "intelligent" than prior initial rotor position detection systems.

SUMMARY OF THE INVENTION

It is object of the invention to provide a PMSM initial rotor position determination system which operates more accurately than prior initial rotor position detection systems.

It is another object of the invention to provide a PMSM initial rotor position determination system which operates more efficiently than prior initial rotor position detection systems.

It is another object of the invention to provide a system and method for accurately determining the initial position of a motor when its rotor is stationary.

It is another object of the invention to provide a PMSM initial rotor position determination system which is more economical than prior initial rotor position detection systems.

It is another object of the invention to provide a motor controller algorithm for initial position detection of a PMSM motor in such a way as to improve initial position detection accuracy.

It is another object of the invention to provide a PMSM initial rotor position determination system which is more robust than prior initial rotor position detection systems.

It is another object of the invention to provide a PMSM initial rotor position determination system which is more "intelligent" than prior initial rotor position detection systems.

Briefly described, and in accordance with one embodiment, the present invention provides a system for determining an initial position of a rotor (9) of a PMSM motor includes a motor controller (2) coupled to a plurality of phase windings of the motor by means of an actuation circuit (3). A processor (12) and an interface circuit (14) are coupled to the processor and the phase windings. The processor determines if the rotor speed is zero, and if so causes the actuation circuit to sequentially apply voltage signals (Vab, Vba, Vac, Vca, Vbc, and Vcb) to the phase windings to produce corresponding phase winding current signals (Iab, Icb, Ica, Iba, Ibc, Iac) in the various phase windings. The phase winding current signals are sensed and digitized and of the processor then determines a position of a magnetic flux path associated with the rotor by computing the initial position of the rotor from one of the digitized phase winding current signals that is associated with the predetermined magnetic flux path.

In one embodiment, the invention provides a system for determining an initial position of a rotor (9) of a PMSM (permanent magnet synchronous motor) motor (8), including a motor controller (2) coupled to a plurality of phase windings (A,B,C) of the PMSM motor (8) by means of an actuation circuit (3). The processor (12) and an interface circuit (14) in the motor controller (2) are coupled to the processor and the phase windings (A,B,C). The processor (12) operates to determine if the speed of the rotor (9) is zero, and if it is, also operates to cause the actuation circuit (3) to sequentially apply voltage signals (Vab, Vba, Vac, Vca, Vbc, and Vcb) to the phase windings (A,B,C) to produce corresponding phase winding current signals (Iab, Icb, Ica, Iba, Ibc, Iac) in the various phase windings (A,B,C). Sensing and digitizing circuitry ($R_{SNS}$,30,28) senses then digitizes the phase winding current signals (Iab, Icb, Ica, Iba, Ibc, Iac). The processor (12) determines a position of a predetermined magnetic flux path associated with the rotor (9) by computing the initial position of the rotor (9) from one of the digitized phase winding current signals associated with the predetermined magnetic flux path.

In one embodiment, the processor (12) operates prior to the determining of the rotor speed in order to provide normalized phase winding current signals (Iab, Icb, Ica, Iba, Ibc, Iac), by causing the voltage signals (Vab, Vba, Vac, Vca, Vbc, and Vcb) to be repeatedly, sequentially applied to the phase windings (A,B,C) to repeatedly produce corresponding phase winding current signals (Iab, Icb, Ica, Iba, Ibc, Iac) in the various phase windings (A,B,C) over a 360° angular range corresponding to one rotation of the rotor (9) a predetermined number of times. The processor (12) also operates to cause the sensing and digitizing circuitry ($R_{SNS}$,30,28) to sense and digitize the phase winding current signals (Iab, Icb, Ica, Iba, Ibc, Iac). The processor (12) also operates to average the repeatedly produced and digitized phase winding current signals (Iab, Icb, Ica, Iba, Ibc, Iac). In the described embodiment, the predetermined number of times is approximately 500 and the number of phase windings is equal to 3.

In one embodiment, the processor (12) determines upper (A) and lower (B) reference points which define intersections between normalized phase winding currents (Iab, Icb, Ica, Iba, Ibc, Iac) which are maximal and normalized phase winding currents (Iab, Icb, Ica, Iba, Ibc, Iac) which are minimal.

In one embodiment, the processor (12) computes the initial position of the rotor (9) in accordance with the expression $$M=(I_A-I_B)/30, \quad \text{Eqn. (1)}$$

where M is a slope of a line between a lower reference point (B) and an upper reference point (A), and in accordance with either the expression Rotor position angle=$(30°) \times S+M \times (Ip-I_B)$ for an odd-numbered sub-sector $S$, or the expression    Eqn. (2):

Rotor position angle=$(30°) \times S-M \times (Ip-I_B)$ for an even-numbered sub-sector $S$,    Eqn. (3):

where $I_A$ is the amplitude of the induced current at an upper reference point (A) and $I_B$ is the amplitude of the induced current at a lower reference point (B).

In one embodiment, the processor (12) performs digital signal processing to accomplish a filtering operation. In one embodiment, the processor (12) determines a suitable current level for the PMSM motor (8) such that there is a measurable inductance variation and such that error due to noise is suitably small (block 54 in FIG. 6). In one embodiment, the processor (12) measures noise and offsets (block 52 in FIG. 6) prior to the determining of the suitable current level for averaging noise and offsets generated by associated electrical circuitry. In one embodiment, the processor (12) provides the normalized phase winding current signals (Iab, Icb, Ica, Iba, Ibc, and Iac) at random rotor positions the predetermined number of times (block 56 of FIG. 6).

In one embodiment, the interface circuit (14) includes an ADC (analog to digital converter) (22) coupled between the PMSM motor (8) and the processor (12). In one embodiment, the actuation circuit (3) includes power transistor circuitry (6) for sequentially driving the phase windings (A, B, and C) and a driver circuit (4) for controlling the power transistor circuitry (6).

In one embodiment, processor (12) stores the normalized phase current winding data in a lookup table, wherein the computing of the initial position of the rotor (9) from the one of the digitized phase winding current signals associated with the predetermined magnetic flux path includes making comparisons of the data in the lookup table.

In one embodiment, the sensing and digitizing circuitry ($R_{SNS}$,30,28) includes a shunt resistor ($R_{SNS}$) coupled in series with one of the phase windings (A, B, or C), an amplifier (32) coupled to receive a voltage across the shunt resistor ($R_{SNS}$), and an ADC (40) for digitizing the voltage across the shunt resistor ($R_{SNS}$.)

In one embodiment, the invention provides a method for determining an initial position of a rotor (9) of a PMSM (permanent magnet synchronous motor) motor (8), including coupling a motor controller (2) to a plurality of phase windings (A,B,C) of the PMSM motor (8) by means of an actuation circuit (3); coupling a processor (12) to the phase windings (A,B,C) by means of an interface circuit (14); determining if the speed of the rotor (9) is zero, and if it is zero, sequentially applying voltage signals (Vab, Vbc, Vca) to the phase windings (A,B,C) to produce corresponding phase winding current signals (Iab, Icb, Ica, Iba, Ibc, Iac) in the various phase windings (A,B,C); sensing and digitizing the phase winding current signals (Iab, Icb, Ica, Iba, Ibc, Iac); and determining a position of a predetermined magnetic flux path associated with the rotor (9) by computing the initial position of the rotor (9) from one of the digitized phase winding current signals associated with the predetermined magnetic flux path.

In one embodiment, the method includes, prior to the rotor speed determining, providing normalized phase winding current signals (Iab, Icb, Ica, Iba, Ibc, Iac) by causing the voltage signals (Vab, Vba, Vac, Vca, Vbc, and Vcb) to be repeatedly, sequentially applied to the phase windings (A,B,C) to repeatedly produce corresponding phase winding current signals (Iab, Icb, Ica, Iba, Ibc, Iac) in the various phase windings (A,B,C) over a 360° angular range corresponding to one rotation of the rotor (9) a predetermined number of times, sensing and digitizing the phase winding current signals (Iab, Icb, Ica, Iba, Ibc, Iac), and averaging the repeatedly produced and digitized phase winding current signals (Iab, Icb, Ica, Iba, Ibc, Iac).

In one embodiment, the method includes determining upper (A) reference points which define intersections between normalized phase winding currents (Iab, Icb, Ica, Iba, Ibc, Iac) which are maximal and which define intersections between normalized phase winding currents (Iab, Icb, Ica, Iba, Ibc, Iac) which are minimal.

In one embodiment, the method includes computing the initial position of the rotor (9) in accordance with the expression $$M = (I_A - I_B)/30, \quad \text{Eqn. (1)}$$

where M is a slope of a line between a lower reference point (B) and an upper reference point (A),
and in accordance with either the expression $$\text{Rotor position angle} = (30°) \times S + M \times (I_p - I_B) \text{ for an odd-numbered sub-sector } S \quad \text{Eqn. (2):}$$

or the expression $$\text{Rotor position angle} = (30°) \times S - M \times (I_p - I_B) \text{ for an even-numbered sub-sector } S \quad \text{Eqn. (3):}$$

where $I_A$ is the amplitude of the induced current at an upper reference point (A) and $I_B$ is the amplitude of the induced current at a lower reference point (B).

In one embodiment, the invention provides a system for determining an initial position of a rotor (9) of a PMSM (permanent magnet synchronous motor) motor (8), including a motor controller (2) coupled to a plurality of phase windings (A,B,C) of the PMSM motor (8) by means of an actuation circuit (3); a processor (12) coupled to the phase windings (A,B,C) by means of an interface circuit (14); means (12,72, 4,6) for determining if the speed of the rotor (9) is zero, and if it is, sequentially applying voltage signals (Vab, Vba, Vac, Vca, Vbc, and Vcb) to the phase windings (A,B,C) to produce corresponding phase winding current signals (Iab, Icb, Ica, Iba, Ibc, Iac) in the various phase windings (A,B,C); means ($R_{SNS}$,32,40) for sensing and digitizing the phase winding current signals (Iab, Icb, Ica, Iba, Ibc, Iac); and means (12, 60 in FIG. 7) for determining a position of a predetermined magnetic flux path associated with the rotor (9) by computing the initial position of the rotor (9) from one of the digitized phase winding current signals associated with the predetermined magnetic flux path.

In one embodiment, the system includes means (12,$R_{SNS}$, 30,28, 49 in FIG. 6) for operating prior to the determination of rotor speed to provide normalized phase winding current signals (Iab, Icb, Ica, Iba, Ibc, Iac) by causing the voltage signals (Vab, Vba, Vac, Vca, Vbc, and Vcb) to be repeatedly, sequentially applied to the phase windings (A,B,C) to repeatedly produce corresponding phase winding current signals (Iab, Icb, Ica, Iba, Ibc, Iac) in the various phase windings (A,B,C) over a 360° angular range corresponding to one rotation of the rotor (9) a predetermined number of times, sensing and digitizing the phase winding current signals (Iab, Icb, Ica, Iba, Ibc, Iac), and averaging the repeatedly produced and digitized phase winding current signals (Iab, Icb, Ica, Iba, Ibc, Iac).

BRIEF DESCRIPTION OF THE DRAWINGS

FIG. 3A shows a waveform of voltage pulses applied between the various A, B, and C phase windings of motor 8 in FIG. 1.

FIG. 3B shows a waveform of induced phase winding currents that flow through the sensing resistor $R_{SNS}$ in FIG. 2A.

FIG. 6 is a flowchart of a normalization/averaging process utilized to generate the normalized phase current winding waveforms utilized to determine initial rotor position.

FIG. 7 is a flowchart of a process for determining initial rotor position from the normalized phase winding current waveforms shown in FIG. 5.

DETAILED DESCRIPTION OF THE PREFERRED EMBODIMENTS

Figure 1:
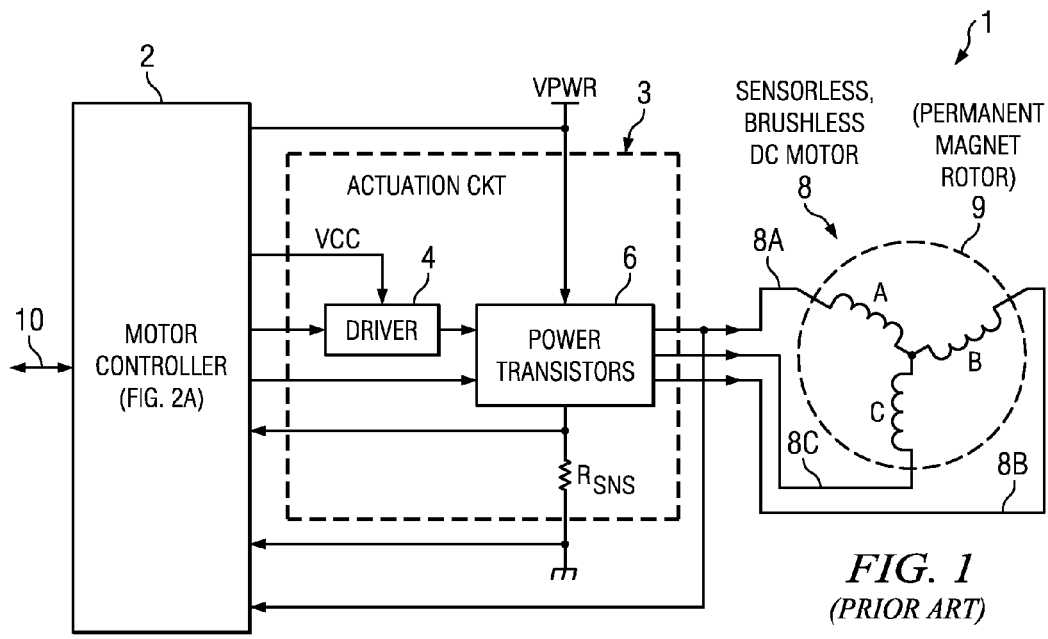
FIG. 1 is a diagram of a conventional system including a sensorless, brushless DC motor and associated control circuitry.

FIG. 1 shows a generalized motor system 1 which includes a motor controller 2, an actuation circuit 3 including a driver circuit 4 and a power transistor circuit 6, a sense resistor $R_{SNS}$, and a sensorless, brushless DC motor 8. Motor 8, which also may be referred to as a PMSM motor, has three phase windings A, B, and C having external terminals 8A, 8B, and 8C, respectively. Six MOS transistors (not shown) in power transistor circuit 6 are utilized to appropriately apply or "inject" 6 voltage pulses Vab, Vba, Vac, Vca, Vbc, and Vcb (shown in FIG. 3A) to the appropriate combinations of the pairs of external winding terminals 8A, 8B, and 8C, respectively. A shunt resistor $R_{SNS}$ is sequentially connected in series with the 3 possible pairs of phase windings A, B, and C to measure or detect the phase winding currents Iab, Icb, Ica, Iba, Ibc and Iac which are generated or induced in the various pairs of phase windings A, B, and C in response to the injected Vab, Vba, Vac, Vca, Vbc, and Vcb voltage pulses, an ADC 40 (FIG. 2B) which provides digital representations of the resulting phase winding currents Iab, Icb, Ica, Iba, Ibc and Iac and applies them as inputs to a microcontroller 12 in motor controller 2.

In FIG. 3A, the sequentially injected voltage pulses Vab, Vba, Vac, Vca, Vbc, and Vcb appear as square waves. FIG. 3B shows the phase winding currents Iab, Icb, Ica, Iba, Ibc and Iac (which are sequentially induced in the various motor phase windings A, B, and C in response to the sequentially injected voltage pulses Vab, Vba, Vac, Vca, Vbc, and Vcb) and which then flow through shunt resistor $R_{SNS}$). Various power transistors (not shown) in block 6 of FIG. 1 are turned on for a certain duration and that causes the voltage pulse to be applied across the appropriate peer of phase windings, which have an inductance coupled in series with the channel resistance of the power transistor. The current in the pair of phase windings across which the voltage pulse is applied therefore rises from zero to a maximum level during that duration. At the end of the voltage pulse, the current in the same pair of phase windings decreases back to zero, resulting in the triangular phase winding current waveforms shown in FIG. 3B.

When determining the initial position of permanent magnet rotor 9, motor controller 2 generates the voltage pulses Vab, Vba, Vac, Vca, Vbc, and Vcb which are applied to sequentially energize the various pairs of phase windings A, B, and C of motor 8 in FIG. 3B. Motor controller 8 can be controlled or programmed through a communication channel 10 that can use one or more common communication architectures, such as an integrated circuit UART (Universal Asynchronous Receiver/Transmitter). The phase winding currents Iab, Icb, Ica, Iba, Ibc and Iac sequentially induced in phase windings A, B, and C in response to injected voltage pulses Vab, Vba, Vac, Vca, Vbc, and Vcb, respectively, are sensed by means of sense resistor $R_{SNS}$. The phase winding currents Iab, Icb, Ica, Iba, Ibc and Iac should be small enough in magnitude to maintain the initial rotor position currents at suitable levels (e.g., roughly 2 amperes) for a sufficiently long durations (e.g., roughly 1 millisecond) to allow reliable detection or determination of the rotor position. That is, the induced current levels should be sufficiently high to allow determination of initial rotor position without causing any rotor movement.

Figure 2A:
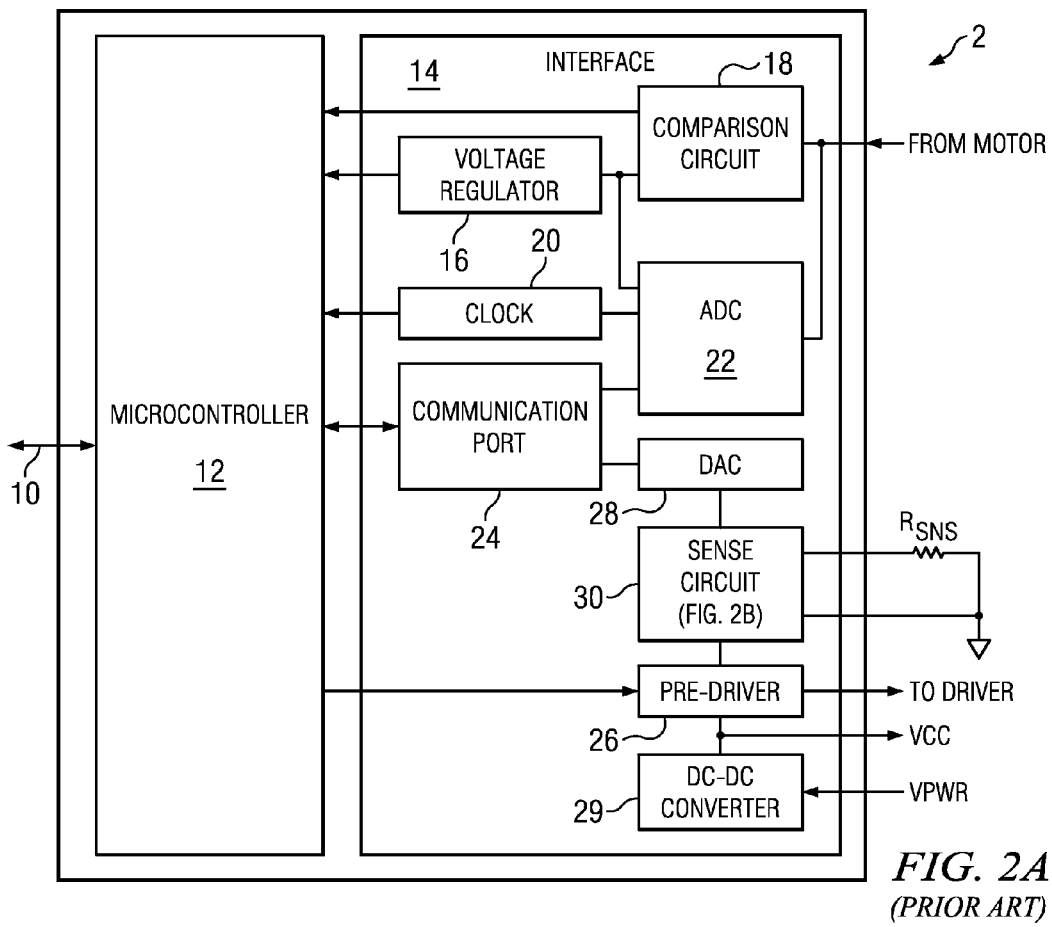
FIG. 2A is a block diagram of the motor controller shown in block 2 of FIG. 1.

Referring to FIG. 2A, motor controller 2 typically is an integrated circuit that is coupled to external components such as sense resistor $R_{SNS}$, and includes microcontroller 12 which can, for example, include an 8-bit RISC (reduced instruction set computing) processor including a memory (not shown). Motor controller 2 also includes an interface circuit 14 that generally includes a voltage regulator 16, a comparison circuit 18, a clock circuit 20 (which can, for example, provide a 50 MHz clock signal), and an analog-to-digital converter (ADC) 22. Motor controller 12 also includes a communication port circuit 24 (which can, for example, provide communications to the microcontroller 12 through a serial peripheral interface (SPI) protocol), a pre-driver circuit 26, a digital-to-analog converter (DAC) 28, a DC-DC converter 29, and a sense circuit 30. Voltage regulator 16 (which can, for example, include one or more low dropout (LDO) voltage regulators) can regulate the supply voltage $V_{CC}$ (which can be between about 8 volts and 15 volts, a typical voltage being roughly about 12 volts) from DC-DC converter 2.

Comparison circuit 18 (which is described in greater detail below) and ADC 22 provide signals to microcontroller 12 to enable normal operation of motor 8. Pre-driver circuit 26 (which can, for example, include one or more level shifters) provides the voltage pulses Vab, Vba, Vac, Vca, Vbc, and Vcb to driver 4 of FIG. 1 so as to either calibrate motor 8 and determine the initial position of the stationary, i.e., non-rotating, permanent magnet rotor 9 of motor 8 or to enable control of PMSM motor 8 during normal operation. Sense circuit 30 and DAC 28 (which are described in greater detail below) enable the initial position detection of rotor 9 and provide over-current detection (during normal operation). DC-DC converter 29 (which is typically a buck converter) provides supply voltage $V_{CC}$ from a power supply voltage $V_{PWR}$ (i.e., between about 20 volts and about 100 volts with a typical voltage of about 48 volts). DC-DC converter 29 can also include several external components (i.e., inductors and capacitors which are external to microcontroller 12.

Figure 2B:
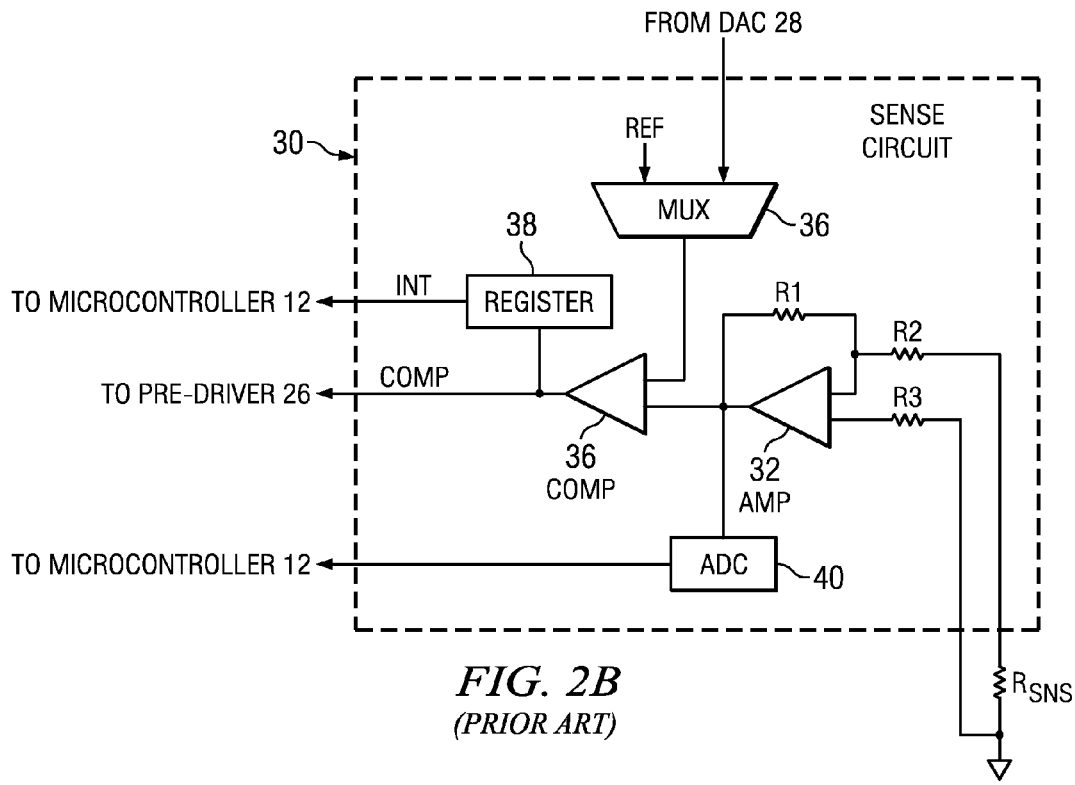
FIG. 2B is a diagram of a sense circuit in block 22 in FIG. 2A.
Figure 2C:
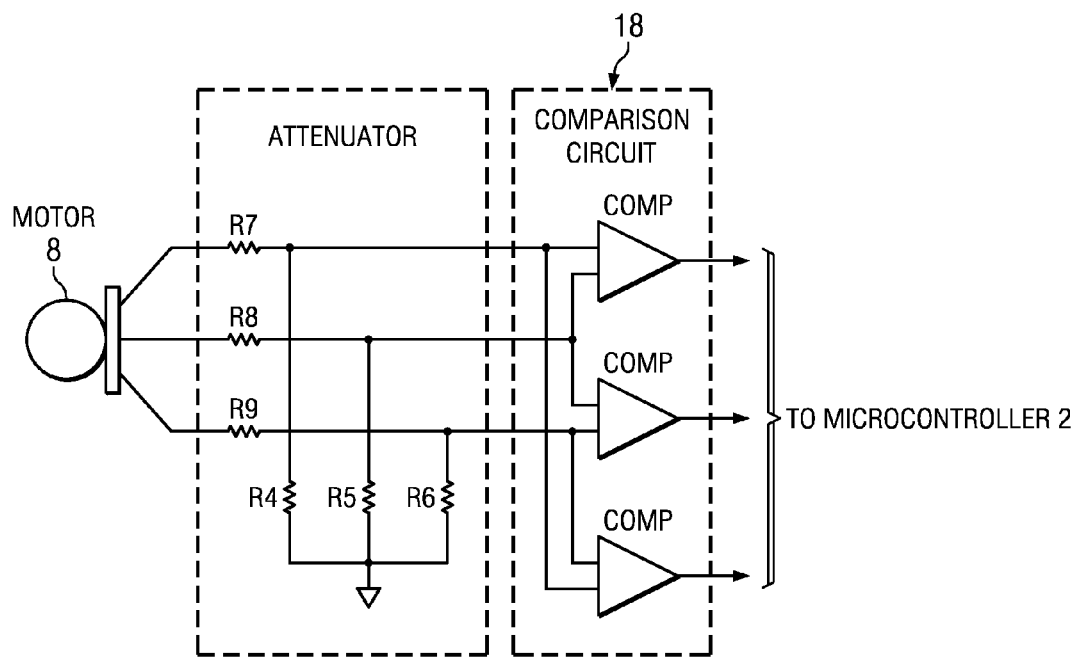
FIG. 2C is a diagram which includes a comparison circuit in block 18 of FIG. 2B.

FIG. 2B shows details of sense circuit 30 and can provide two functions, including current sensing to determine the initial position of permanent magnet rotor 9 at motor startup and over-current detection during normal operation. Sense circuit 30 includes an amplifier 32, a current-limit comparator 34, a multiplexer 36, a register 38, and above mentioned ADC 40. Amplifier 32 (which, in conjunction with resistors R1, R2 and R3, can provide a gain of between about 1 and about 4) amplifies the voltage drop across sense resistor $R_{SNS}$. That voltage drop corresponds to current traversing any pair of the three windings A, B, and C of motor 8 during initial position detection. The amplified sense voltage produced by amplifier 32 is used during the initial motor startup to determine the initial position of the stationary rotor 9 and also to perform the function of controlling mortar 8 during normal operation.

To determine the initial rotor position at startup, ADC 40 digitizes the amplified sense voltage, and since the currents traversing the various pairs of the 3 phase windings A, B, and C are proportional to the amplified sense voltage produced by amplifier 32, ADC 40 in effect digitizes a measurement of each of phase winding currents Iab, Icb, Ica, Iba, Ibc and Iac. The digitized measurements are then provided to microcontroller 12 through communication port 24 so that microcontroller 12 can determine the initial stationary rotor position directly from the measurements of the voltage drop across shunt resistor $R_{SNS}$.

Figure 4A:
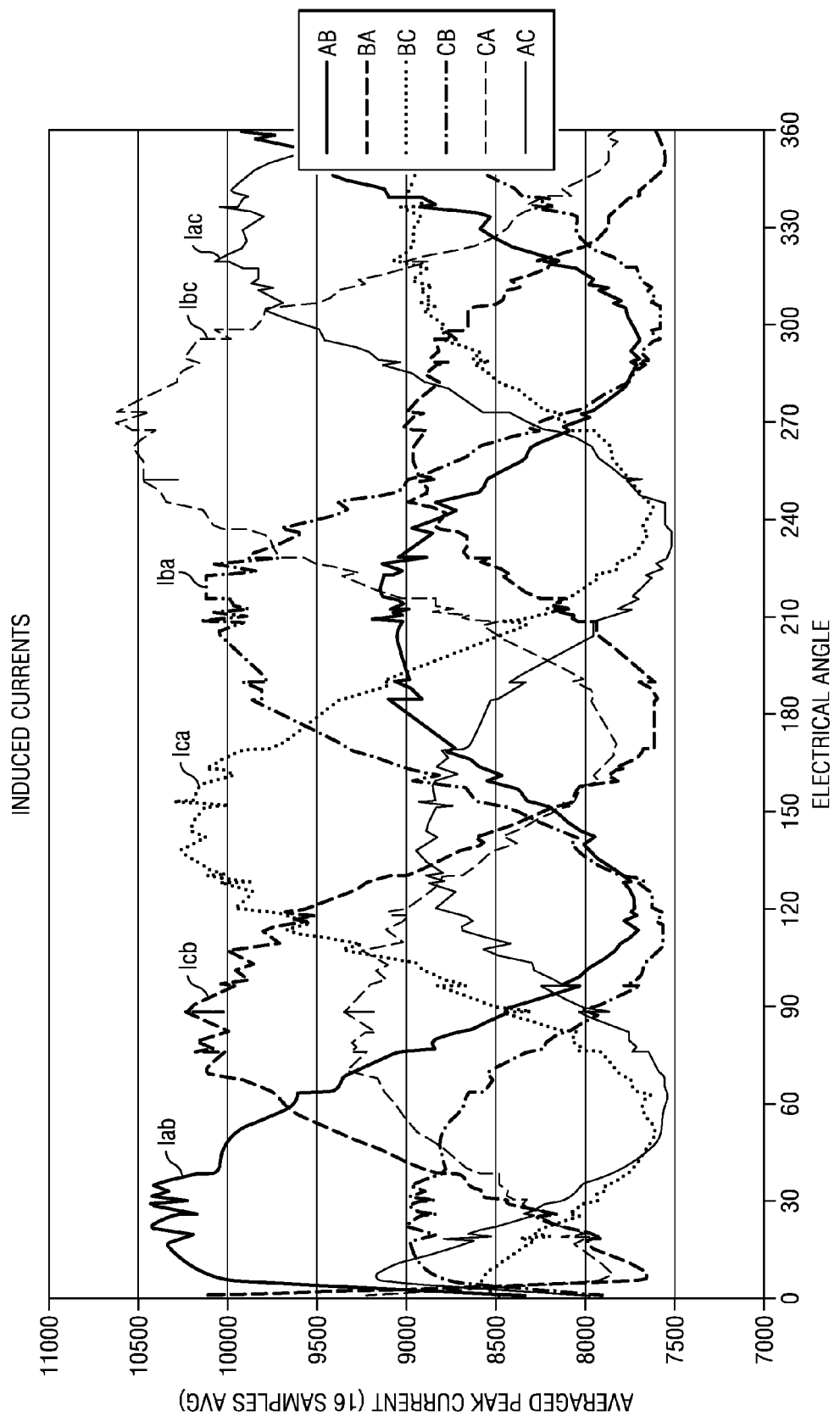
FIG. 4A shows waveforms of sensed and digitized phase winding currents produced in response to the voltage pulses shown in FIG. 3A.

To make the determination of the initial position of permanent magnet rotor 9 while it is stationary, motor controller 2 uses the above-mentioned voltage pulses Vab, Vba, Vac, Vca, Vbc, and Vcb (the number of which is double the number of phase windings of motor 8) as shown in FIG. 3A to sequentially energize all permutations of the pairs of induced phase currents Iab, Icb, Ica, Iba, Ibc and Iac, which are shown in FIG. 4A, such that they traverse the various 3 pairs of phase windings in a predetermined sequence. For example, for voltage pulse Vab, the induced phase winding current Iab traverses phase A and phase B in one direction, while for corresponding voltage pulse Vba, the induced phase winding current Iba would traverse phase winding B and phase winding A in the opposite direction. The 6 induced current signals Iab, Icb, Ica, Iba, Ibc and Iac as shown in FIG. 4A are detected by sensing them at 360 points (in this example) through a 0° to 360° rotation of the rotor 9, in the same order as voltage pulses Vab, Vba, Vac, Vca, Vbc, and Vcb.

The motor winding currents Iab, Icb, Ica, Iba, Ibc and Iac are detected sequentially in order to determine the magnetic flux paths in the air gap between the rotor and stator of PMSM motor 8. The 6 voltage pulses Vab, Vba, Vac, Vca, Vbc, and Vcb are sequentially applied to motor windings A, B, and C, and corresponding points of the 6 resulting phase current waveforms of Iab, Icb, Ica, Iba, Ibc and Iac produced in motor windings A, B, and C are sequentially sensed in the order indicated in FIG. 3B by means of resistor $R_{SNS}$, amplifier 32, and comparator 36. Because permanent magnet rotor 9 initially is stationary, no electrical signals are occurring within PMSM motor 8 for control purposes. The voltage pulses Vab, Vba, Vac, Vca, Vbc, and Vcb are injected into corresponding motor winding terminals 8A, 8B, and 8C (FIG. 1), respectively, to generate the rising and falling edges of induced currents Iab, Icb, Ica, Iba, Ibc and Iac from which the initial stationary rotor position may be determined.

The 6 voltage pulses Vab, Vba, Vac, Vca, Vbc, and Vcb are used to ultimately determine the rotor position by repetitively producing or inducing a large number of the 6 phase winding currents Iab, Icb, Ica, Iba, Ibc and Iac which then are averaged to generate corresponding "normalized" phase winding currents Iab, Icb, Ica, Iba, Ibc and Iac. The normalized phase winding currents Iab, Icb, Ica, Iba, Ibc and Iac then are compared to generate difference values. A lookup table (LUT) of the difference values may be used to make the determination of rotor position. The difference values are utilized to determine the rotor position, in accordance with the diagrams in FIGS. 4B, 5, and 7.

The described embodiment of the invention provides a 2-stage algorithm for (1) "normalizing" or averaging a large number of each of the sensed induced phase winding currents Iab, Icb, Ica, Iba, Ibc and Iac to produce normalized phase winding currents Iab, Icb, Ica, Iba, Ibc and Iac which are relatively independent of motor parameter variations and temperature variations, and (2) determining the initial position of permanent magnet rotor 9 of PMSM motor 8 in such a way as to greatly improve the initial rotor position accuracy, by in effect indirectly sensing the rotor flux position while rotor 9 is stationary.

Normalizing Phase Winding Currents

It should be understood that induced phase winding currents Iab, Icb, Ica, Iba, Ibc and Iac are dependent on the methods and materials used to PMSM manufacture motor 8 and also are dependent on motor temperature. Consequently, initial rotor position determinations based on induced phase winding currents Iab, Icb, Ica, Iba, Ibc and Iac for one PMSM motor or one type/design of a PMSM motor may be erroneous for a different PMSM motor or different type of PMSM motor. Therefore, is important to identify the main factors that cause motor-to-motor errors in detecting rotor position. Motor-to-motor parameter differences may occur because the motors are of a different type or at a different temperature. The "normalizing" technique represented by the flowchart in subsequently described FIG. 6 is provided for substantially reducing the effect of such parameter and temperature differences on the induced phase winding currents Iab, Icb, Ica, Iba, Ibc and Iac by generating the normalized phase winding currents. (Note that induced currents depend on motor parameters, which vary from motor to motor, and also depend on the sensing circuitry, which varies from one printed circuit board to the next.)

Figure 4B:
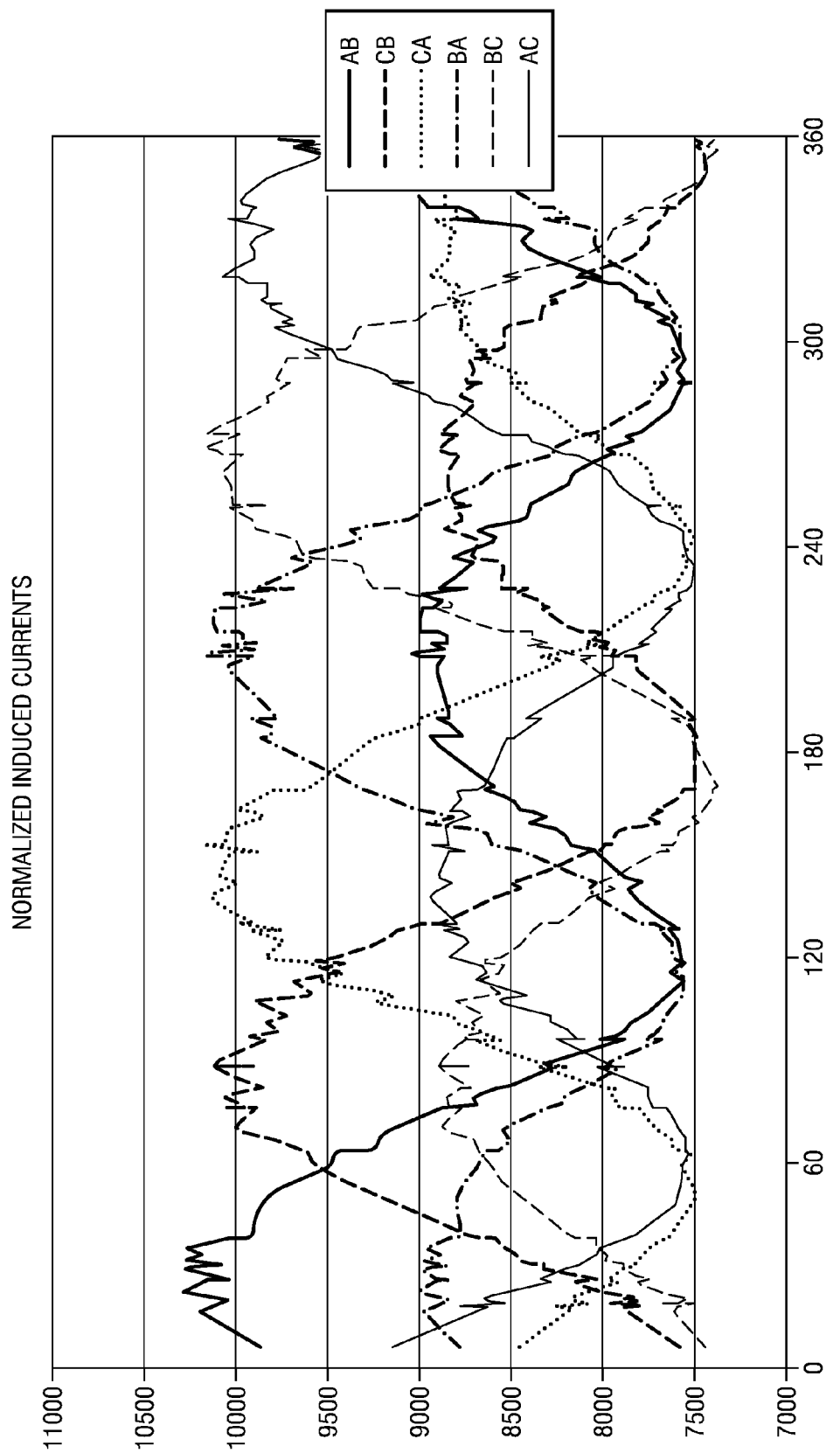
FIG. 4B shows normalized waveforms of phase winding currents produced in response to the voltage pulses shown in FIG. 3A.
Figure 5:
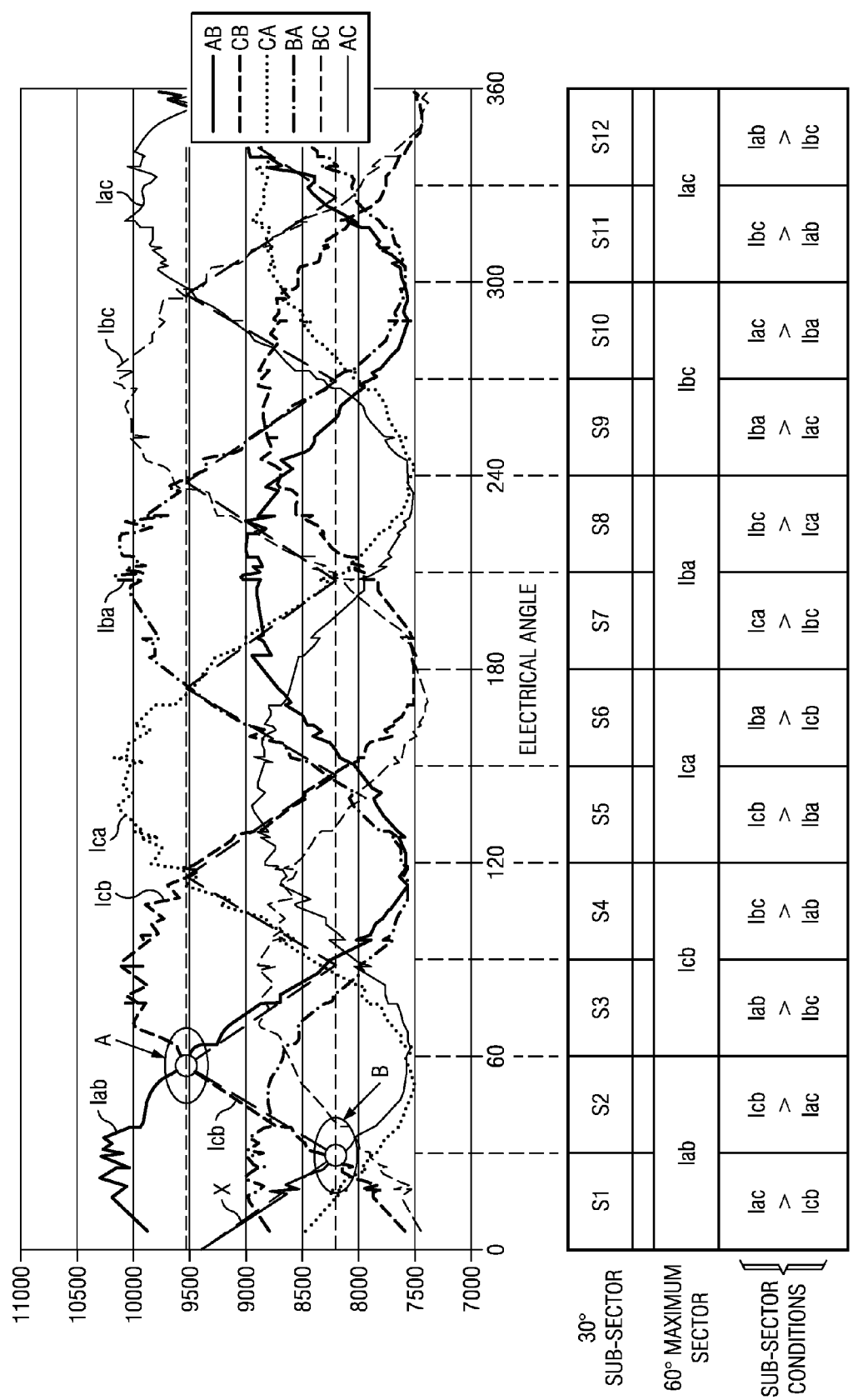
FIG. 5 shows the normalized current waveforms of FIG. 4B aligned with 30° sub-sector and 60° comparison sector tables utilized to precisely determine initial rotor position.

FIG. 6 indicates the normalization process utilized to generate the above-mentioned normalized phase winding currents represented by the waveforms of Iab, Icb, Ica, Iba, Ibc and Iac shown in FIGS. 4B and 5. These normalized waveforms are utilized to determine initial rotor position with rotor 9 stationary. As indicated in block 50 of FIG. 6, the first step in the normalization process is to obtain "nameplate" data, especially the rated motor current, of the PMSM motor 8 to be "calibrated". The values of the rated motor current may be used to determine a suitable current level to be induced for detection of the rotor position. As indicated in block 52, noise and offset associated with PMSM motor 8 is measured. Such noise and offset are caused by the variation of the sensing circuitry.

Next, as indicated in block 54, the normalization algorithm determines the appropriate induced phase winding current level needed for the present PMSM motor 8 so that (1) suitable phase winding inductance variation is achieved, and (2) errors due to the noise become relatively small.

Block 56 of FIG. 6 indicates the most basic aspects of the normalization process of taking samples of the rotor winding currents and averaging them. This involves applying or injecting the 6 voltage pulses Vab, Vba, Vac, Vca, Vbc, and Vcb and corresponding phase winding currents 1a, 1b, and Ice to external terminals 8A, 8B, and 8C of appropriate pairs of phase windings A, B, and C while permanent magnet rotor 9 is stationary. This results in inducing the 6 corresponding phase winding current values Iab, Icb, Ica, Iba, Ibc and Iac in the various phase windings A, B, and C. If rotor 9 then is rotated to a different arbitrary position, the 6 corresponding induced phase winding current values Iab, Icb, Ica, Iba, Ibc and Iac will be different than when rotor 9 is in the initial neutral position. To obtain the indirect phase winding current values required for the normalization procedure, rotor 9 is rotated to a number of different predetermined electrical angles, depending on the number of desired samples, from 0° through 360° and the resulting 6 induced phase winding current values of Iab, Icb, Ica, Iba, Ibc and Iac are sensed or sampled at each predetermined electrical angle. The voltage pulses Vab, Vba, Vac, Vca, Vbc, and Vcb in FIG. 3A are sequentially applied in such a manner as to provide the values of induced phase winding currents Iab, Icb, Ica, Iba, Ibc and Iac at the desired different predetermined electrical angles from 0° through 360°. This results in the induced phase winding current waveforms of Iab, Icb, Ica, Iba, Ibc and Iac as shown in FIG. 4A.

Then, as also indicated in block 56 of FIG. 6, the foregoing procedure is repeated a suitably large number of times, e.g., 500 times, and the resulting induced currents Iab, Icb, Ica, Iba, Ibc and Iac are repetitively (e.g., 500 times) sensed by means of a shunt resistor $R_{SNS}$, amplifier 32, and ADC 40 and sense circuit 30, and then the resulting induced currents Iab, Icb, Ica, Iba, Ibc and Iac are digitized and provided as inputs to microcontroller 12. Microcontroller 12 then averages the large number of corresponding sensed values to obtain the normalized or averaged phase winding currents Iab, Icb, Ica, Iba, Ibc and Iac. Thus, at each predetermined electrical angle the 500 values are averaged for each of induced phase winding currents Iab, Icb, Ica, Iba, Ibc and Iac to produce the normalized phase winding current waveforms for Iab, Icb, Ica, Iba, Ibc and Iac as shown in FIG. 4B. The normalized Iab, Icb, Ica, Iba, Ibc and Iac curves, respectively, as shown in FIG. 4B each appear as an average of the 500 corresponding individual sensed phase winding Iab, Icb, Ica, Iba, Ibc and Iac curves shown in FIG. 4A. The normalized phase winding waveforms in FIG. 4B represent the various normalized magnetic flux paths in PMSM motor 8.

As indicated in block 58 of FIG. 6, the algorithm computes (1) phase offsets in the normalized induced phase windings (which significantly affect the values of the reference points A and B), and also (2) the "reference points" A and B shown in the graph including the normalized Iab, Icb, Ica, Iba, Ibc and Iac waveforms shown in FIG. 5. Reference points A and B are intersection points of two of the phase winding current waveforms and are determined on the basis of the previously mentioned large number of samples from which the normalized Iab, Icb, Ica, Iba, Ibc and Iac waveforms are determined. Note that the values $I_A$ and $I_Y$ of reference points A and B, respectively, are significantly affected by the normalization process. Reference point A occurs at the highest or "maximal" intersection of the normalized waveforms of phase winding currents Iab and Icb, and reference point B occurs at the lowest or "minimal" intersection of the normalized waveforms of phase winding currents Iac and Icb.

The foregoing process achieves the needed normalization or averaging not only of the PMSM motor parameters but also achieves the needed normalization of variations due to variations in motor hardware and the needed normalization with respect to motor temperature. The data representing the normalized curves in FIG. 4B then is used to estimate rotor position using the initial position detection algorithm shown in FIG. 7. Note that the foregoing normalization process is performed for every individual PMSM motor 8.

Using Normalized Phase Winding Current Data to Determine Initial Rotor Position

The normalized phase winding current waveforms of Iab, Icb, Ica, Iba, Ibc and Iac in FIG. 4B are reproduced at the top of FIG. 5 and are aligned with sections of a "table" including rectangular six 60° sectors corresponding to the six 60° sectors in which the various six normalized Iab, Icb, Ica, Iba, Ibc and Iac, respectively, curves have a "maximal" or maximum amplitude. The table also includes twelve 30° "sub-sectors" S1, S2,1 . . . S12, two 30° sub-sectors being included in each 60° sector, respectively. Each 30° sub-sector is appropriately aligned with the normalized waveforms of Iab, Icb, Ica, Iba, Ibc and Iac and indicates the sub-sector S of the twelve 30° sub-sectors S1, S2,1 . . . S12 in which the initial rotor position lies, by identifying each of six 60° sectors in which a different one of the normalized Iab, Icb, Ica, Iba, Ibc and Iac waveforms has a "maximal" value and also indicating criteria for determining in which sub-sector S of the twelve 30° sub-sectors S1, S2,1 . . . S12 the initial rotor position lies. The boundaries of the twelve 30° sub-sectors S1, S2,1 . . . S12 are determined by the various previously mentioned reference points A and B. It should be noted that the foregoing technique also is capable of detecting rotor position while rotor 9 is not stationary.

The graph including the normalized phase winding currents Iab, Icb, Ica, Iba, Ibc and Iac in FIG. 5 also includes a triangular waveform X having upper maximum values at the upper reference points A and lower minimum values at the lower reference points B. Triangular waveform X in FIG. 5 thus is defined by the various intersection points A and B, and extends from 0° to 360°. The slope M of triangular waveform X can be computed from the difference between a lower reference point B and the next upper reference point A, divided by the sub-sector width 30°, that is, by the expression $$M=(I_A-I_B)/30. \quad \text{Eqn. (1)}$$

The sub-sector S in which the initial rotor position lies is determined by microcontroller 12 and is identified by comparison of the amplitudes of the 6 normalized currents, for example by using a lookup table containing the normalized phase winding current amplitudes of the Iab, Icb, Ica, Iba, Ibc and Iac waveforms. The magnetic flux represented by one of the 6 normalized currents Iab, Icb, Ica, Iba, Ibc and Iac is selected to represent the initial position of permanent magnet rotor 9. The initial rotor position based on the current value Ip of the present phase winding current having a maximal value in the 30° sub-sector S in which the rotor position lies is computed by the expression $$\text{Rotor position angle}=(30°) \times S + M \times (I_p - I_B) \text{ for an odd-numbered sub-sector } S \quad \text{Eqn. (2):}$$

or by the expression $$\text{Rotor position angle}=(30°) \times S - M \times (I_p - I_B) \text{ for an even-numbered sub-sector } S \quad \text{Eqn. (3):}$$

FIG. 7 shows a flowchart of the initial rotor position detection algorithm for determining initial rotor position based partly on the normalized phase winding current waveforms shown in FIG. 5. A main controller program in motor controller 2 calls up the initial rotor position detection algorithm as indicated in label 70 of FIG. 7 when an initial rotor position is needed and checks the speed of rotor 7, as indicated in block 72. If the rotor speed is equal to zero, the algorithm goes to block 74 and applies the 6 voltage pulses Vab, Vba, Vac, Vca, Vbc, and Vcb so as to "inject" or induce corresponding phase winding currents Iab, Icb, Ica, Iba, Ibc and Iac in phase windings A, B, and C, and those induced phase winding currents are sampled and utilized to obtain the value of Ip in Equations (2) and (3).

The rotor position detection algorithm then goes to block 76 and performs a filtering operation for the purpose of digital signal processing (DSP), and also performs a data processing operation for the purpose of performing a digital filtering operation. One of the 6 normalized phase winding currents will always be greater than the other 5 in any 60° sector. For example, the normalized Iab phase winding current from about 40° to 60° (electrical degrees) is "maximal" with respect to the remaining 5 normalized phase winding currents. Furthermore, for 0° through 30° Iac>Icb, and for ° to 60° Icb>Iac. Similarly, for 60° through 120°, Icb is maximal or greater than all of the 5 other normalized phase winding currents, and so forth. Thus, in accordance with block 76, the first thing that needs to done is to identify in which of the 60° sectors each of the 6 normalized phase winding current waveforms is maximal or greater than in the other 5 sectors, in order to obtain the 30° sub-sector of "S" to be used in Equation (2) or (3).

Triangle waveform X in FIG. 5 defines the partitions between the various 60° sectors and also between the 30° sub-sectors, and the two conditions that define the two 30° sub-sectors within each 60° sector are indicated in FIG. 5. For example, if the condition Iac>Icb is met, it is known that the initial rotor position is within sub-sector S1, and if the condition Icb>Iac is met, then it is known that the initial rotor position is in sub-sector S2, and so forth. Next, the rotor position detection algorithm goes to block 78 and utilizes Equation (1) and Equation (2) or (3) to precisely determine the position of permanent magnet rotor 9. Then, as indicated by label 80, the algorithm returns to the program which called up the rotor position detection algorithm of FIG. 7.

To summarize, a "robustness" algorithm is proposed for PMSM initial rotor position estimation through indirect detection of magnetic flux in the PMSM motor, using injection of 6 short voltage pulses and corresponding induced current pulses into the 3 motor windings. By processing the amplitudes of the 6 resulting phase winding currents generated in the phase windings, the rotor position is determined. There are 3 steps for the initial rotor position estimation: (1) normalization or averaging of a suitable number of repetitions, at random rotor positions, of the 6 current waveforms generated in response to a certain pattern of short voltage pulses applied to the phase windings, to minimize the estimation error due to variations of motor manufacturing and motor temperature; (2) the sub-sector in which the initial rotor position lies is determined by comparison of the amplitudes of the 6 normalized phase winding currents. In the described 3 phase PMSM motor, there are 12 sub-sectors in each 360° electrical cycle, each sub-sector spanning 30 electrical degrees; (3) the phase winding current which has the most linear function between rotor position and current amplitude is selected to precisely identify the relationship between the rotor position and the induced phase winding currents so the initial rotor position can be computed much more precisely than the ±30° accuracy associated with the prior art, and (4) the initial rotor position is calculated on the basis of phase winding currents injected while the rotor is stationary, using equations based on the normalization process.

The injection of the 6 short voltage pulses over a 360° electrical cycle is performed instead of using conventional low carrier frequency injection. No knowledge of specific motor parameters is required. The procedures not especially complex, and accuracy of ±5 electrical degrees is achieved for the initial rotor position.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

What is claimed is:

1. A system for determining an initial position of a rotor of a PMSM (permanent magnet synchronous motor) motor, comprising:
   (a) a motor controller coupled to a plurality of phase windings of the PMSM motor by means of an actuation circuit;
   (b) a processor, and an interface circuit in the motor controller coupled to the processor and the phase windings;
   (c) the processor being operative to determine if the speed of the rotor is zero, and if the speed is zero, also being operative to cause the actuation circuit to sequentially apply voltage signals to the phase windings to produce corresponding phase winding current signals in the various phase windings;
   (d) circuitry for sensing and digitizing the phase winding current signals; and
   (e) the processor being operative to determine a position of a predetermined magnetic flux path associated with the rotor by computing the initial position of the rotor from one of the digitized phase winding current signals associated with the predetermined magnetic flux path;
   wherein the processor is operative prior to the rotor speed determining in order to provide normalized phase winding current signals by causing the voltage signals to be repeatedly, sequentially applied to the phase windings to repeatedly produce corresponding phase winding current signals in the various phase windings over a 360° angular range corresponding to one rotation of the rotor a predetermined number of times, the processor also being operative to cause the sensing and digitizing circuitry to sense and digitize the phase winding current signals, the processor also being operative to average the repeatedly produced and digitized phase winding current signals to thereby provide the normalized phase winding current signals.

2. The system of claim 1 wherein the predetermined number of times is approximately 500.

3. The system of claim 1 wherein the number of phase windings is equal to 3.

4. The system of claim 3 wherein the processor determines upper and lower reference points which define intersections between normalized phase winding currents which are maximal and normalized phase winding currents which are minimal.

5. The system of claim 4 wherein the processor computes the initial position of the rotor in accordance with the expression $$M=(I_A-I_B)/30, \quad \text{Eqn. (1)}$$

where M is a slope of a line between a lower reference point and an upper reference point, and in accordance with either the expression $$\text{Rotor position angle}=(30°)\times S+M\times(Ip-I_B) \text{ for an odd-numbered sub-sector } S \quad \text{Eqn. (2):}$$

or the expression $$\text{Rotor position angle}=(30°)\times S-M\times(Ip-I_B) \text{ for an even-numbered sub-sector } S, \quad \text{Eqn. (3):}$$

where $I_A$ is the amplitude of the induced current at an upper reference point and $I_B$ is the amplitude of the induced current at a lower reference point.

6. The system of claim 5 wherein the processor performs a digital signal processing operation to accomplish to accomplish a digital filtering operation.

7. The system of claim 5 wherein the processor is operative to store normalized phase current winding data in a lookup table, and wherein the computing of the initial position of the rotor from the one of the digitized phase winding current signals associated with the predetermined magnetic flux path includes making comparisons of the data in the lookup table.

8. The system of claim 1 wherein the processor is operative to determine a suitable current level for the PMSM motor such that there is a measurable inductance variation and such that error due to noise is relatively small.

9. The system of claim 8 wherein the processor is operative to measure noise and offsets prior to the determining of the suitable current level for averaging noise and offsets generated by associated electrical circuitry.

10. The system of claim 1 wherein the processor is operative to provide the normalized phase winding current signals at random rotor positions the predetermined number of times.

11. A method for determining an initial position of a rotor of a PMSM (permanent magnet synchronous motor) motor, comprising:
   (a) coupling a motor controller to a plurality of phase windings of the PMSM motor by means of an actuation circuit;
   (b) coupling a processor to the phase windings by means of an interface circuit;
   (c) providing normalized phase winding current signals by causing the voltage signals to be repeatedly, sequentially applied to the phase windings to repeatedly produce corresponding phase winding current signals in the various phase windings over a 360° angular range corresponding to one rotation of the rotor a predetermined number of times;
   (d) averaging the repeatedly produced and digitized phase winding current signals to thereby provide the normalized phase winding current signals;
   (e) sensing and digitizing the phase winding current signals;
   (f) determining if the speed of the rotor is zero, and if the speed is zero, sequentially applying voltage signals to the phase windings to produce corresponding phase winding current signals in the various phase windings;
   (g) sensing and digitizing the phase winding current signals; and
   (h) determining a position of a predetermined magnetic flux path associated with the rotor by computing the initial position of the rotor from one of the digitized phase winding current signals associated with the predetermined magnetic flux path.

12. The method of claim 11 including determining upper reference points which define intersections between normalized phase winding currents that are maximal and determining lower reference points which define intersections between normalized phase winding currents that are minimal.

13. The method of claim 12 including computing the initial position of the rotor in accordance with the expression $$M=(I_A-I_B)/30, \quad \text{Eqn. (1)}$$

where M is a slope of a line between a lower reference point and an upper reference point,
and in accordance with either the expression $$\text{Rotor position angle} = (30°) \times S + M \times (I_P - I_B) \text{ for an odd-numbered sub-sector } S \quad \text{Eqn. (2)}$$

or the expression $$\text{Rotor position angle} = (30°) \times S - M \times (I_P - I_B) \text{ for an even-numbered sub-sector } S \quad \text{Eqn. (3)}$$

where $I_A$ is the amplitude of the induced current at an upper reference point and $I_B$ is the amplitude of the induced current at a lower reference point.

* * * * *